(12) United States Patent
Oota et al.

(10) Patent No.: US 10,792,895 B2
(45) Date of Patent: Oct. 6, 2020

(54) COLORED LIGHT EMITTING SHEET AND COLORED LIGHT EMITTING GLASS

(71) Applicant: SEKISUI CHEMICAL CO., LTD., Osaka (JP)

(72) Inventors: Yuusuke Oota, Shiga (JP); Yasuyuki Izu, Roermond (NL); Daisuke Nakajima, Shiga (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 16/473,383

(22) PCT Filed: Mar. 27, 2018

(86) PCT No.: PCT/JP2018/012445
§ 371 (c)(1),
(2) Date: Jun. 25, 2019

(87) PCT Pub. No.: WO2018/181318
PCT Pub. Date: Oct. 4, 2018

(65) Prior Publication Data
US 2020/0139680 A1 May 7, 2020

(30) Foreign Application Priority Data
Mar. 29, 2017 (JP) .................................. 2017-066003

(51) Int. Cl.
| | |
|---|---|
| *F21V 9/32* | (2018.01) |
| *B32B 17/10* | (2006.01) |
| *C08J 5/18* | (2006.01) |
| *C08K 3/26* | (2006.01) |
| *C08K 5/12* | (2006.01) |
| *C08K 5/56* | (2006.01) |
| *C08K 13/02* | (2006.01) |
| *C09K 11/02* | (2006.01) |
| *C09K 11/06* | (2006.01) |
| *E06B 7/28* | (2006.01) |

(52) U.S. Cl.
CPC .. *B32B 17/10669* (2013.01); *B32B 17/10036* (2013.01); *B32B 17/10541* (2013.01); *B32B 17/10605* (2013.01); *B32B 17/10761* (2013.01); *C08J 5/18* (2013.01); *C08K 3/26* (2013.01); *C08K 5/12* (2013.01); *C08K 5/56* (2013.01); *C08K 13/02* (2013.01); *C09K 11/02* (2013.01); *C09K 11/06* (2013.01); *E06B 7/28* (2013.01); *F21V 9/32* (2018.02); *C08J 2329/14* (2013.01); *C08K 2003/265* (2013.01); *C09K 2211/1011* (2013.01); *C09K 2211/1029* (2013.01); *C09K 2211/182* (2013.01)

(58) Field of Classification Search
None
See application file for complete search history.

(56) References Cited

U.S. PATENT DOCUMENTS

| | | |
|---|---|---|
| 2013/0050983 A1 | 2/2013 | Labrot et al. |
| 2013/0242562 A1 | 9/2013 | Labrot |
| 2016/0288460 A1 | 10/2016 | Nakayama et al. |

FOREIGN PATENT DOCUMENTS

| | | |
|---|---|---|
| JP | 2010-159318 | 7/2010 |
| JP | 2010-159319 | 7/2010 |
| JP | 2013-538172 | 10/2013 |
| JP | 2013-539741 | 10/2013 |
| JP | 2015-196618 | 11/2015 |
| JP | 2016-537480 | 12/2016 |
| WO | 2014/077328 | 5/2014 |
| WO | 2015/038497 | 3/2015 |
| WO | 2015/194224 | 12/2015 |

OTHER PUBLICATIONS

International Search Report dated Jul. 3, 2018 in International (PCT) Application No. PCT/JP2018/012445.

*Primary Examiner* — Vip Patel
(74) *Attorney, Agent, or Firm* — Wenderoth, Lind & Ponack, L.L.P.

(57) ABSTRACT

The present invention aims to provide a colored luminescent sheet that enables production of a colored glass providing better aesthetic appearance, and a colored luminescent glass including the colored luminescent sheet. Provided is a colored luminescent sheet including: a thermoplastic resin; a colorant; and a luminescent material that emits visible light having a wavelength of 380 to 750 nm under excitation light.

8 Claims, No Drawings

COLORED LIGHT EMITTING SHEET AND COLORED LIGHT EMITTING GLASS

TECHNICAL FIELD

The present invention relates to a colored luminescent sheet that enables production of a colored glass providing better aesthetic appearance, and a colored luminescent glass including the colored luminescent sheet.

BACKGROUND ART

Laminated glass is less likely to scatter even when fractured by external impact and can be safely used. Due to this advantage, laminated glass has been widely used in, for example, front, side, and rear windshields of vehicles including automobiles and windowpanes of aircraft, buildings, or the like. A known example of laminated glass is a type of laminated glass including at least a pair of glass plates integrated with, for example, an interlayer film for a laminated glass which contains a liquid plasticizer and a polyvinyl acetal resin.

Recently, the properties required of glass have been increasingly diversified. From the aspects of the aesthetic appearance, privacy protection, and light-shielding effect, there are increasing needs for a colored glass that has a colored portion in part or the whole of the glass. For example, when a colored glass that is translucent milky white at a desired part is used as a building window glass, the window can provide privacy protection while providing excellent aesthetic appearance. When a partly colored glass is used as an automobile roof glass, for example, the automobile roof can block light from the outside to control the light conditions in the automobile, while providing excellent aesthetic appearance.

Patent Literature 1, for example, discloses an interlayer film for a laminated glass including a dark color section, a gradation section, and a transparent section, in which these sections are situated along side each other in the stated order in the direction orthogonal to the thickness direction, and also discloses a colored glass including the interlayer film for laminated glass. Although the colored glass disclosed in Patent Literature 1 provides a certain level of aesthetic appearance, providing a colored glass exhibiting better aesthetic appearance has become an important issue in the industry.

CITATION LIST

Patent Literature

Patent Literature 1: WO2014/077328

SUMMARY OF INVENTION

Technical Problem

The present invention aims to provide a colored luminescent sheet that enables production of a colored glass providing better aesthetic appearance, and a colored luminescent glass including the colored luminescent sheet.

Solution to Problem

The present invention relates to a colored luminescent sheet including: a thermoplastic resin; a colorant; and a luminescent material that emits visible light having a wavelength of 380 to 750 nm under excitation light.

The present invention is described in detail below.

In order to achieve a colored glass providing better aesthetic appearance, the present inventors considered the type and amount of a colorant to be added to the interlayer film for laminated glass, and also considered the use of other components in combination with the colorant. As a result, the inventors found out that when a colorant is used in combination with a luminescent material that emits visible light having a wavelength of 380 to 750 nm under excitation light, and when the colored glass is irradiated with excitation light that allows the luminescent material to emit light, the colored glass can provide particularly excellent aesthetic appearance that is unattainable with a colorant alone and that can also be described as "blurred luminescence". The inventors thus completed the present invention.

The colored luminescent sheet of the present invention contains a thermoplastic resin, a colorant, and a luminescent material.

Any thermoplastic resin may be used, and examples thereof include polyvinyl acetal resins, ethylene-vinyl acetate copolymer resins, ethylene-acryl copolymer resins, polyurethane resins, polyurethane resins containing sulfur element, polyvinyl alcohol resins, vinyl chloride resins, and polyethylene terephthalate resins. Suitable among these are polyvinyl acetal resins because a polyvinyl acetal resin used in combination with a plasticizer can exhibit excellent adhesion to a transparent plate in the case where the colored luminescent sheet of the present invention and a transparent plate such as a glass plate are stacked.

The polyvinyl acetal may be any polyvinyl acetal obtained by acetalization of polyvinyl alcohol with an aldehyde, and is preferably polyvinyl butyral. Two or more kinds of polyvinyl acetals may be used in combination as needed.

The lower limit of the degree of acetalization of the polyvinyl acetal is preferably 40 mol % and the upper limit thereof is preferably 85 mol %. The lower limit is more preferably 60 mol % and the upper limit is more preferably 75 mol %.

The lower limit of the hydroxy group content of the polyvinyl acetal is preferably 15 mol % and the upper limit thereof is preferably 35 mol %. When the hydroxy group content is 15 mol % or more, formation of the colored luminescent sheet is facilitated. When the hydroxy group content is 35 mol % or less, the colored luminescent sheet to be obtained is easy to handle.

The degree of acetalization and the hydroxy group content can be measured in accordance with, for example, "Testing methods for polyvinyl butyral" in JIS K 6728.

The polyvinyl acetal can be prepared by acetalization of polyvinyl alcohol with an aldehyde. The polyvinyl alcohol is normally prepared by saponification of polyvinyl acetate. Polyvinyl alcohol commonly used has a degree of saponification of 70 to 99.8 mol %.

The lower limit of the degree of polymerization of the polyvinyl alcohol is preferably 500 and the upper limit thereof is preferably 4,000. When the polyvinyl alcohol has a degree of polymerization of 500 or more, the laminated glass produced using the colored luminescent sheet to be obtained has higher penetration resistance. When the polyvinyl alcohol has a degree of polymerization of 4,000 or less, formation of the colored luminescent sheet is facilitated. The lower limit of the degree of polymerization of the polyvinyl alcohol is more preferably 1,000 and the upper limit thereof is more preferably 3,600.

Any aldehyde may be used, and commonly preferred is a C1-C10 aldehyde. Any C1-C10 aldehyde may be used, and examples thereof include n-butyraldehyde, isobutyraldehyde, n-valeraldehyde, 2-ethylbutyraldehyde, n-hexylaldehyde, n-octylaldehyde, n-nonylaldehyde, n-decylaldehyde, formaldehyde, acetaldehyde, and benzaldehyde. Preferred among these are n-butyraldehyde, n-hexylaldehyde, and n-valeraldehyde, and more preferred is n-butyraldehyde. These aldehydes may be used alone or in combination of two or more thereof.

The colorant has a role of coloring the sheet and, in combination with the luminescent material, providing excellent aesthetic appearance.

Any colorant may be used. Examples thereof include pigments, dyes, and colored toners. These colorants may be used alone or in combination of two or more thereof. Preferred among them are pigments because they can provide particularly excellent aesthetic appearance.

Any pigment may be used. Usable pigments include conventionally known inorganic pigments and organic pigments. Inorganic pigments are suitable because they have excellent stability.

Examples of the inorganic pigment include white pigments such as calcium carbonate, zinc oxide, white lead, lithopone, titanium dioxide, precipitated barium sulfate, and barite powder, red pigments such as minium and red iron oxide, yellow pigments such as chrome yellow and zinc yellow, blue pigments such as ultramarine blue and Prussian blue, and black pigments such as carbon black. These inorganic pigments may be used alone or in combination of two or more thereof. Suitable among them are white pigments because they can color the sheet milky white to provide particularly excellent aesthetic appearance. Particularly suitable among them is calcium carbonate.

Any dye may be used. Examples thereof include azo dyes, anthraquinone dyes, and phthalocyanine dyes. These dyes may be used alone or in combination of two or more thereof.

Any colored toner may be used. Examples thereof include green, black, blue, and red color toners. These colored toners may be used alone or in combination of two or more thereof.

The amount of the colorant in the colored luminescent sheet is not particularly limited. The lower limit thereof relative to 100 parts by weight of the thermoplastic resin is preferably 0.1 parts by weight, and the upper limit thereof is preferably 15 parts by weight. When the amount of the colorant is within this range, the colorant used in combination with the luminescent material can provide excellent aesthetic appearance. The lower limit of the amount of the colorant is more preferably 0.5 parts by weight, and the upper limit thereof is more preferably 10 parts by weight.

The luminescent material is a luminescent material that emits visible light having a wavelength of 380 to 750 nm under excitation light. The combined use of such a luminescent material and the colorant allows the colored glass under irradiation with excitation light to provide particularly excellent aesthetic appearance that is unattainable with a colorant alone and that can also be described as "blurred luminescence".

The luminescent material may be any luminescent material that emits visible light having a wavelength of 380 to 750 nm under excitation light, and may be a conventionally known luminescent material. One luminescent material may be used alone, or two or more luminescent materials may be used in combination. In particular, suitable luminescent materials include a lanthanoid complex with a multidentate ligand containing a halogen atom and a luminescent material having a terephthalic acid ester structure, because they can emit light at high luminance.

Among lanthanoid complexes, the lanthanoid complex with a multidentate ligand containing a halogen atom emits light at a high intensity under irradiation with light. Examples of the lanthanoid complex with a multidentate ligand containing a halogen atom include lanthanoid complexes with a bidentate ligand containing a halogen atom and lanthanoid complexes with a tridentate ligand containing a halogen atom. Examples thereof also include lanthanoid complexes with a tetradentate ligand containing a halogen atom, lanthanoid complexes with a pentadentate ligand containing a halogen atom, and lanthanoid complexes with a hexadentate ligand containing a halogen atom.

In particular, a lanthanoid complex with a bidentate ligand containing a halogen atom or a lanthanoid complex with a tridentate ligand containing a halogen atom emits light having a wavelength of 580 to 780 nm at a significantly high intensity under irradiation with light having a wavelength of 300 to 410 nm. Owing to such high-intensity luminescence, a colored luminescent sheet containing the lanthanoid complex can sufficiently emit light even under very weak excitation light, and allows production of a colored glass providing particularly excellent aesthetic appearance with "blurred luminescence".

In addition, the lanthanoid complex with a bidentate ligand containing a halogen atom and the lanthanoid complex with a tridentate ligand containing a halogen atom are also excellent in heat resistance. Thus, even in the case where the colored luminescent sheet is used outdoors under infrared irradiation, deterioration of the luminescent material due to high temperature can be prevented.

As used herein, examples of the lanthanoid include lanthanum, cerium, praseodymium, neodymium, promethium, samarium, europium, gadolinium, terbium, dysprosium, holmium, erbium, thulium, ytterbium, and lutetium. For even higher emission intensity, the lanthanoid is preferably neodymium, europium, or terbium, more preferably europium or terbium, still more preferably europium.

Examples of the lanthanoid complex with a bidentate ligand containing a halogen atom include tris(trifluoroacetylacetone)phenanthroline europium, tris(trifluoroacetylacetone)diphenyl phenanthroline europium, tris(hexafluoroacetylacetone)diphenyl phenanthroline europium, tris(hexafluoroacetylacetone)bis(triphenylphosphine) europium, tris(trifluoroacetylacetone)2,2'-bipyridine europium, and tris(hexafluoroacetylacetone)2,2'-bipyridine europium.

Examples of the lanthanoid complex with a tridentate ligand containing a halogen atom include terpyridine trifluoroacetylacetone europium and terpyridine hexafluoroacetylacetone europium.

Examples of the halogen atom in the lanthanoid complex with a bidentate ligand containing a halogen atom or the lanthanoid complex with a tridentate ligand containing a halogen atom include a fluorine atom, a chlorine atom, a bromine atom, and an iodine atom. Preferred is a fluorine atom for better stability of the ligand structure.

Among the lanthanoid complexes with a bidentate ligand containing a halogen atom or the lanthanoid complexes with a tridentate ligand containing a halogen atom, a lanthanoid complex with a bidentate ligand containing a halogen atom and having an acetylacetone skeleton is preferred because of its excellent initial luminescent properties.

Examples of the lanthanoid complex with a bidentate ligand containing a halogen atom and having an acetylacetone skeleton include Eu(TFA)₃phen, Eu(TFA)₃dpphen, Eu(HFA)₃phen, [Eu(FOD)₃]bpy, [Eu(TFA)₃]tmphen, and [Eu(FOD)₃]phen. The structures of these lanthanoid complexes with a bidentate ligand containing a halogen atom and having an acetylacetone skeleton are shown below.

[Chem. 1]

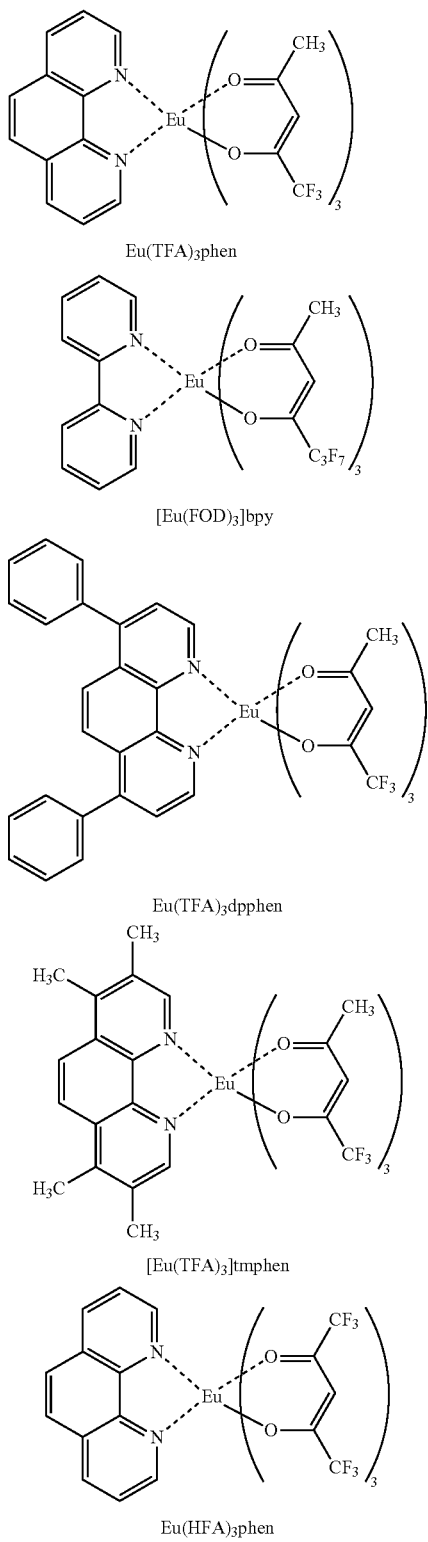

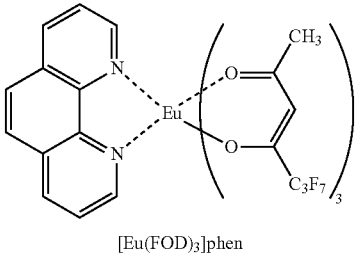

[Eu(FOD)₃]phen

The lanthanoid complex with a bidentate ligand containing a halogen atom or the lanthanoid complex with a tridentate ligand containing a halogen atom is preferably in the form of particles. The lanthanoid complex with a bidentate ligand containing a halogen atom or the lanthanoid complex with a tridentate ligand containing a halogen atom in the form of particles can be readily finely dispersed in the colored luminescent sheet.

In the case where the lanthanoid complex with a bidentate ligand containing a halogen atom or the lanthanoid complex with a tridentate ligand containing a halogen atom is in the form of particles, the lower limit of the average particle size of the lanthanoid complex is preferably 0.01 μm and the upper limit thereof is preferably 10 μm. The lower limit is more preferably 0.03 μm and the upper limit is more preferably 1 μm.

Examples of the luminescent material having a terephthalic acid ester structure include compounds having a structure represented by the formula (1) and compounds having a structure represented by the formula (2).

These may be used alone or in combination of two or more thereof.

[Chem. 2]

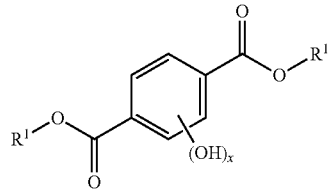

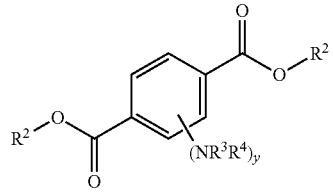

In the formula (1), $R^1$ is an organic group and x is 1, 2, 3, or 4.

For higher transparency of the colored luminescent sheet, x is preferably 1 or 2, and the luminescent material has a hydroxy group more preferably at 2 or 5 position of the benzene ring, still more preferably at 2 and 5 positions of the benzene ring.

The organic group of $R^1$ is preferably a hydrocarbon group, more preferably a C1-C10 hydrocarbon group, still more preferably a C1-C5 hydrocarbon group, particularly preferably a C1-C3 hydrocarbon group.

When the hydrocarbon group has 10 or less carbon atoms, the luminescent material having a terephthalic acid ester structure can be easily dispersed in the colored luminescent sheet.

The hydrocarbon group is preferably an alkyl group.

Examples of the compound having a structure represented by the formula (1) include diethyl-2,5-dihydroxyterephthalate and dimethyl-2,5-dihydroxyterephthalate.

In particular, for display of an image at higher contrast, the compound having a structure represented by the formula (1) is preferably diethyl-2,5-dihydroxylterephthalate ("diethyl 2,5-dihydroxyterephthalate" available from Sigma-Aldrich).

In the formula (2), $R^2$ is an organic group, $R^3$ and $R^4$ each are a hydrogen atom or an organic group, and y is 1, 2, 3, or 4.

The organic group of $R^2$ is preferably a hydrocarbon group, more preferably a C1-C10 hydrocarbon group, still more preferably a C1-C5 hydrocarbon group, particularly preferably a C1-C3 hydrocarbon group.

When the hydrocarbon group has a carbon number satisfying the upper limit, the luminescent material having a terephthalic acid ester structure can be easily dispersed in the colored luminescent sheet.

The hydrocarbon group is preferably an alkyl group.

In the formula (2), $NR^3R^4$ is an amino group.

$R^3$ and $R^4$ each are preferably a hydrogen atom.

The benzene ring in the compound having a structure represented by the formula (2) may have the amino group(s) at the position(s) of one hydrogen atom, two hydrogen atoms, three hydrogen atoms, or four hydrogen atoms among hydrogen atoms of the benzene ring.

For display of an image at higher contrast, the compound having a structure represented by the formula (2) is preferably diethyl-2,5-diaminoterephthalate (Sigma-Aldrich).

The amount of the luminescent material in the colored luminescent sheet of the present invention may be appropriately adjusted according to the type of the luminescent material. The lower limit of the amount of the luminescent material relative to 100 parts by weight of the thermoplastic resin is preferably 0.001 parts by weight, and the upper limit thereof is preferably 10 parts by weight. When the amount of the luminescent material is within this range, the luminescent material used in combination with the colorant can provide excellent aesthetic appearance. The lower limit of the amount of the luminescent material is more preferably 0.01 parts by weight and the upper limit thereof is more preferably 8 parts by weight. The lower limit is still more preferably 0.1 parts by weight and the upper limit is still more preferably 5 parts by weight.

The ratio between the amount of the colorant and the amount of the luminescent material in the colored luminescent sheet of the present invention may be appropriately adjusted according to the types of the colorant and the luminescent material. The amount of the luminescent material is preferably smaller than that of the colorant. When the amount of the luminescent material is smaller than that of the colorant, the luminescent colored sheet can more easily provide particularly excellent aesthetic appearance that can also be described as "blurred luminescence". Specifically, the lower limit of the amount of the luminescent material relative to 100 parts by weight of the colorant is preferably 0.1 parts by weight and the upper limit thereof is preferably 50 parts by weight. The lower limit thereof is more preferably 1 part by weight and the upper limit thereof is more preferably 25 parts by weight.

The colored luminescent sheet of the present invention may further contain a plasticizer.

Any plasticizer may be used, and examples thereof include organic ester plasticizers such as monobasic organic acid esters and polybasic organic acid esters, and phosphoric acid plasticizers such as organophosphate plasticizers and organophosphite plasticizers. The plasticizer is preferably a liquid plasticizer.

Any monobasic organic acid ester may be used, and examples thereof include glycol esters obtained by a reaction between a glycol and a monobasic organic acid. Examples of the glycol include triethylene glycol, tetraethylene glycol, and tripropylene glycol. Examples of the monobasic organic acid include butyric acid, isobutyric acid, caproic acid, 2-ethylbutyric acid, heptylic acid, n-octylic acid, 2-ethylhexylic acid, pelargonic acid (or n-nonylic acid), and decylic acid. In particular, preferred are triethylene glycol dicaproate, triethylene glycol-di-2-ethylbutyrate, triethylene glycol-di-n-octylate, and triethylene glycol-di-2-ethylhexylate.

Any polybasic organic acid ester may be used, and examples thereof include ester compounds of a polybasic organic acid (e.g., adipic acid, sebacic acid, azelaic acid) with a C4-C8 linear or branched alcohol. In particular, preferred are dibutyl sebacate, dioctyl azelate, and dibutyl carbitol adipate.

Any organic ester plasticizers may be used, and examples thereof include triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, tetraethylene glycol di-2-ethylhexanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicapriate, dihexyl adipate, dioctyl adipate, hexylcyclohexyl adipate, diisononyl adipate, heptylnonyl adipate, dibutyl sebacate, oil-modified alkyd sebacate, mixtures of phosphoric acid esters and adipic acid esters, adipic acid esters, mixed type adipic acid esters prepared from C4-C9 alkyl alcohols and C4-C9 cyclic alcohols, and C6-C8 adipic acid esters such as hexyl adipate.

Any organophosphate plasticizer may be used, and examples thereof include tributoxyethyl phosphate, isodecylphenyl phosphate, and triisopropyl phosphate.

Among these, the plasticizer is preferably at least one selected from the group consisting of dihexyl adipate (DHA), triethylene glycol di-2-ethylhexanoate (3GO), tetraethylene glycol di-2-ethylhexanoate (4GO), triethylene glycol di-2-ethylbutyrate (3GH), tetraethylene glycol di-2-ethylbutyrate (4GH), tetraethylene glycol di-n-heptanoate (4G7), and triethylene glycol di-n-heptanoate (3G7).

For less hydrolysis, the plasticizer preferably contains triethylene glycol di-2-ethylhexanoate (3GO), triethylene glycol di-2-ethylbutyrate (3GH), tetraethylene glycol di-2-ethylhexanoate (4GO), or dihexyl adipate (DHA), more preferably tetraethylene glycol di-2-ethylhexanoate (4GO) or triethylene glycol di-2-ethylhexanoate (3GO), particularly preferably triethylene glycol di-2-ethylhexanoate.

The amount of the plasticizer in the colored luminescent sheet is not particularly limited. The lower limit thereof is preferably 30 parts by weight and the upper limit thereof is preferably 100 parts by weight relative to 100 parts by weight of the thermoplastic resin. When the amount of the plasticizer is within this range, the colored luminescent sheet is easily formed without impairing the aesthetic appearance of the colored luminescent sheet. The lower limit of the amount of the plasticizer is more preferably 35 parts by weight and the upper limit thereof is more preferably 80 parts by weight. The lower limit is still more preferably 45 parts by weight and the upper limit is still more preferably 70 parts by weight. The lower limit is particularly preferably 50 parts by weight and the upper limit is particularly preferably 63 parts by weight.

The colored luminescent sheet of the present invention preferably contains an adhesion modifier.

The adhesion modifier used is suitably, for example, an alkali metal salt or an alkaline earth metal salt. Examples of the adhesion modifier include salts of potassium, sodium, magnesium, and the like.

Examples of acids constituting the salts include organic acids such as carboxylic acids (e.g., octylic acid, hexylic acid, 2-ethylbutyric acid, butyric acid, acetic acid, formic acid) and inorganic acids such as hydrochloric acid and nitric acid.

The colored luminescent sheet may contain, in addition to the adhesion modifier, potassium, sodium, and magnesium derived from raw materials (e.g., a neutralizing agent) used in production of the thermoplastic resin. When these metals are contained in a large amount, the luminescent properties of the luminescent material may be reduced. Such a reduction in the luminescent properties is particularly noticeable when the luminescent material is a lanthanoid complex with a bidentate ligand containing a halogen atom or a lanthanoid complex with a tridentate ligand containing a halogen atom.

Thus, the total amount of potassium, sodium, and magnesium contained in the colored luminescent sheet is preferably 50 ppm or less. When the total amount of potassium, sodium, and magnesium is 50 ppm or less, the reduction in the luminescent properties of the luminescent material can be prevented.

The colored luminescent sheet of the present invention preferably further contains a dispersant. The use of a dispersant can inhibit aggregation of the luminescent material.

The dispersant used may be, for example, a compound having a sulfonic acid structure such as linear alkyl benzene sulfonates; a compound having an ester structure such as diester compounds, ricinoleic acid alkyl esters, phthalic acid esters, adipic acid esters, sebacic acid esters, and phosphoric acid esters; a compound having an ether structure such as polyoxyethylene glycols, polyoxypropylene glycols, and alkyl phenyl-polyoxyethylene-ethers; a compound having a carboxylic acid structure such as polycarboxylic acids; a compound having an amine structure such as laurylamine, dimethyllaurylamine, oleyl propylenediamine, polyoxyethylene secondary amine, polyoxyethylene tertiary amine, and polyoxyethylene diamine; a compound having a polyamine structure such as polyalkylene polyamine alkylene oxide; a compound having an amide structure such as oleic acid diethanolamide and alkanol fatty acid amide; and a compound having a high-molecular-weight amide structure such as polyvinylpyrrolidone and polyester acid amidoamine salt. Also, the dispersant used may be a high-molecular-weight dispersant such as polyoxyethylene alkyl ether phosphoric acid (salt), high-molecular-weight polycarboxylic acids, and condensed ricinoleic acid esters. The high-molecular-weight dispersant is defined as a dispersant having a molecular weight of 10,000 or higher.

In the case where the luminescent material is a lanthanoid complex with a bidentate ligand containing a halogen atom or a lanthanoid complex with a tridentate ligand containing a halogen atom, the lower limit of the amount of the dispersant relative to 100 parts by weight of the luminescent material in the colored luminescent sheet is preferably 1 part by weight and the upper limit thereof is preferably 50 parts by weight. When the amount of the dispersant is within the above range, the lanthanoid complex with a bidentate ligand containing a halogen atom or the lanthanoid complex with a tridentate ligand containing a halogen atom can be uniformly dispersed in the luminescent sheet. The lower limit of the amount of the dispersant is more preferably 3 parts by weight and the upper limit thereof is more preferably 30 parts by weight. The lower limit is still more preferably 5 parts by weight and the upper limit is still more preferably 25 parts by weight.

The colored luminescent sheet of the present invention may contain additives such as an ultraviolet absorber, an antioxidant, a light stabilizer, and an antistatic agent, as needed.

The colored luminescent sheet of the present invention provides, when irradiated with excitation light that allows the luminescent material to emit light, particularly excellent aesthetic appearance that is unattainable with a colorant alone and that can also be described as "blurred luminescence". The use of the colored luminescent sheet of the present invention enables production of a colored luminescent glass that can provide better aesthetic appearance.

The colored luminescent glass may have any structure, and preferably has a laminated structure including a transparent plate and the colored luminescent sheet of the present invention. The colored luminescent glass with the laminated structure exhibits improved handleability and thus can be applied to various uses. In particular, the colored luminescent glass preferably has a structure (laminated glass structure) in which the colored luminescent sheet of the present invention is interposed between a pair of transparent plates.

The present invention also encompasses a colored luminescent glass having a laminated structure including a transparent plate and the colored luminescent sheet of the present invention.

The present invention also encompasses a colored luminescent glass having a structure in which the colored luminescent sheet of the present invention is interposed between a pair of transparent plates.

The transparent plates may be transparent plate glass commonly used. Examples thereof include inorganic glass such as float plate glass, polished plate glass, molded plate glass, wired glass, wire-reinforced plate glass, colored plate glass, heat-absorbing glass, heat-reflecting glass, and green glass. Also usable is UV light-shielding glass in which a UV light-shielding coat layer is formed on the surface of glass. However, such glass is preferably used as a glass plate on a side opposite to the side irradiated with light having a specific wavelength. Moreover, organic plastic plates such as polyethylene terephthalate, polycarbonate, or polyacrylate plates may also be used.

The transparent plates used may be two or more kinds of transparent plates. Moreover, the transparent plates used may be two or more kinds of transparent plates different in the thickness.

The colored luminescent glass of the present invention in combination with an excitation light source can be used in various uses such as window glass, display windows, partitions, and wall glass.

Advantageous Effects of Invention

The present invention can provide a colored luminescent sheet that enables production of a colored glass providing better aesthetic appearance, and a colored luminescent glass including the colored luminescent sheet.

DESCRIPTION OF EMBODIMENTS

The present invention is more specifically described in the following with reference to, but not limited to, examples.

Example 1

(1) Preparation of Eu(TFA)$_3$phen

Europium acetate (Eu(CH$_3$COO)$_3$) in an amount of 12.5 mmol was dissolved in 50 mL of distilled water. To the solution was added 33.6 mmol of trifluoroacetylacetone (TFA, CH$_3$COCH$_2$COCF$_3$), and the mixture was stirred at room temperature for 3 hours. The mixture was filtered to obtain precipitated solid. The precipitated solid was washed with water, and recrystallized using methanol and distilled water to give Eu(TFA)$_3$(H$_2$O)$_2$. Then, 5.77 g of the resulting complex (Eu(TFA)$_3$(H$_2$O)$_2$) and 2.5 g of 1,10-phenanthroline (phen) were dissolved in 100 mL of methanol, followed by heating under reflux for 12 hours. After 12 hours, methanol was distilled off under reduced pressure, thereby obtaining a white product. The white product powder was washed with toluene and unreacted materials were removed by suction filtration. Subsequently, toluene was distilled off under reduced pressure, thereby preparing a powder. Through recrystallization using a solvent mixture of toluene and hexane, Eu(TFA)$_3$phen was obtained.

(2) Preparation of Colored Luminescent Sheet

To 40 parts by weight of triethylene glycol di-2-ethylhexanoate (3GO) as a plasticizer were added 0.2 parts by weight of Eu(TFA)$_3$phen as a luminescent material, 3.2 parts by weight of calcium carbonate as a pigment, and acetylacetone magnesium in an amount giving a final concentration of 0.036 phr as an adhesion modifier, whereby a colored luminescent plasticizer solution was prepared. The entire amount of the plasticizer solution obtained and 100 parts by weight of polyvinyl butyral (PVB, degree of polymerization: 1700) were sufficiently mixed and kneaded using a mixing roll to prepare a resin composition.

The obtained resin composition was extruded using an extruder to provide a colored luminescent sheet having a thickness of 760 μm.

(3) Production of Colored Luminescent Glass

The obtained colored luminescent sheet was interposed between a pair of clear glass plates (thickness: 2.5 mm, 30 cm in length×30 cm in width) to prepare a laminate. The laminate was pressed under vacuum at 90° C. for 30 minutes to be press-bonded using a vacuum laminator. The press-bonded laminate was subjected to another 20-minute press-bonding under 14 MPa at 140° C. using an autoclave, thereby obtaining a colored luminescent glass having a laminated glass structure.

Example 2

Terbium acetate (Tb(CH$_3$COO)$_3$) in an amount of 12.5 mmol was dissolved in 50 mL of distilled water. To the solution was added 33.6 mmol of trifluoroacetylacetone (TFA, CH$_3$COCH$_2$COCF$_3$), and the mixture was stirred at room temperature for 3 hours. The mixture was filtered to obtain precipitated solid. The precipitated solid was washed with water, and recrystallized using methanol and distilled water to give Tb(TFA)$_3$(H$_2$O)$_2$. Then, 5.77 g of the resulting complex (Tb(TFA)$_3$(H$_2$O)$_2$) and 2.5 g of 1,10-phenanthroline (phen) were dissolved in 100 mL of methanol, followed by heating under reflux for 12 hours. After 12 hours, methanol was distilled off under reduced pressure, thereby obtaining a white product. The white product powder was washed with toluene and unreacted materials were removed by suction filtration. Subsequently, toluene was distilled off under reduced pressure, thereby preparing a powder. Through recrystallization using a solvent mixture of toluene and hexane, Tb(TFA)$_3$phen was obtained.

A colored luminescent sheet and a colored luminescent glass were produced as in Example 1 except that Tb(TFA)$_3$phen was used instead of Eu(TFA)$_3$phen.

Example 3

A colored luminescent sheet and a colored luminescent glass were produced as in Example 1 except that diethyl-2,5-dihydroxyterephthalate (available from Sigma-Aldrich, "diethyl 2,5-dihydroxyterephthalate") was used instead of Eu(TFA)$_3$phen.

Examples 4 and 5

Colored luminescent sheets and colored luminescent glasses were produced as in Example 1 except that the amount of Eu(TFA)$_3$phen added was changed to 0.05 parts by weight or 0.5 parts by weight.

Example 6

A colored luminescent sheet and a colored luminescent glass were produced as in Example 1 except that 3.2 parts by weight of Pigment Blue 15 as a blue pigment was added instead of calcium carbonate.

Example 7

A colored luminescent sheet and a colored luminescent glass were produced as in Example 1 except that 3.2 parts by weight of Pigment Green 7 as a green pigment was added instead of calcium carbonate.

Comparative Examples 1 to 3

Colored luminescent sheets and colored luminescent glasses were obtained as in Examples 1 to 3 except that no calcium carbonate was added.

Comparative Examples 4 to 8

Colored luminescent sheets and colored luminescent glasses were obtained as in Examples 1 to 3, 6, and 7 except that no luminescent material was added.

Evaluation

The colored luminescent glasses obtained in the examples and comparative examples were evaluated by the following methods.

Tables 1 and 2 show the results.

Each of the colored luminescent glasses obtained in the examples and comparative examples was irradiated with light having a wavelength of 405 nm and an output power of 300 mW using "NDV4B16" available from Nichia Corporation as an excitation light source.

The colored luminescent glasses of the examples under irradiation with excitation light provided excellent aesthetic appearance that can also be described as "blurred luminescence" (rated as "o (Good)" or "oo (Excellent)" for the blurred luminescence properties). In particular, the colored luminescent glasses of Examples 1 to 5, which used calcium carbonate as a colorant, provided highly excellent aesthetic appearance (rated as "oo (Excellent)" for the blurred luminescence properties). In contrast, the luminescent glasses of Comparative Examples 1 to 3 did not provide "blurred luminescence" although they emitted light owing to the luminescent material (rated as "x (Poor)" for the blurred luminescence properties). The colored glasses of Comparative Examples 4 to 6 did not emit light even under excitation light irradiation (rated as "x (Poor)" for the blurred luminescence properties).

Twenty observers compared, under irradiation with excitation light, the difference in aesthetic appearance based on the presence or absence of a colorant. Specifically, they compared Examples 1, 4, and 5 with Comparative Example 1, Example 2 with Comparative Example 2, and Example 3 with Comparative Example 3. A rating of "o (Good)" was given when 16 or more of the 20 observers felt that the colored luminescent glass containing a colorant was more beautiful. A rating of "x (Poor)" was given when 15 or less observers felt that the laminated glass containing a colorant was more beautiful.

Similarly, 20 observers compared, under irradiation with excitation light, the difference in aesthetic appearance based on the presence or absence of a luminescent material. Specifically, they compared Example 1 with Comparative Example 4, Example 2 with Comparative Example 5, Example 3 with Comparative Example 6, Example 6 with Comparative Example 7, and Example 7 with Comparative Example 8. A rating of "o (Good)" was given when 16 or more of the 20 observers felt that the colored luminescent glass containing a luminescent material was more beautiful. A rating of "x (Poor)" was given when 15 or less observers felt that the laminated glass containing a luminescent material was more beautiful.

TABLE 1

| | | | | Example 1 | Example 2 | Example 3 | Example 4 | Example 5 | Example 6 | Example 7 |
|---|---|---|---|---|---|---|---|---|---|---|
| Luminescent sheet formulation | PVB | | phr | 100 | 100 | 100 | 100 | 100 | 100 | 100 |
| | 3GO | | phr | 40 | 40 | 40 | 40 | 40 | 40 | 40 |
| | Luminescent material | $Eu(TFA)_3phen$ | phr | 0.2 | — | — | 0.05 | 0.5 | 0.2 | 0.2 |
| | | $Tb(TFA)_3phen$ | phr | — | 0.2 | — | — | — | — | — |
| | | Diethyl 2,5-dihydroxy-terephthalate | phr | — | — | 0.2 | — | — | — | — |
| | Colorant | Calcium carbonate | phr | 3.2 | 3.2 | 3.2 | 3.2 | 3.2 | — | — |
| | | Pigment Blue 15 | phr | — | — | — | — | — | 3.2 | — |
| | | Pigment Green 7 | phr | — | — | — | — | — | — | 3.2 |
| | Adhesion modifier | Acetylacetone magnesium | phr | 0.036 | 0.036 | 0.036 | 0.036 | 0.036 | 0.036 | 0.036 |
| Evaluation | Blurred luminescence properties | | | oo | oo | oo | oo | oo | o | o |
| | Comparison on aesthetic appearances | Comparison with glass not containing colorant (Comparative Examples 1 to 3) | | o | o | o | o | o | o | o |
| | | Comparison with glass not containing luminescent material (Comparative Examples 4 to 8) | | o | o | o | o | o | o | o |

TABLE 2

| | | | | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|---|---|
| Luminescent sheet formulation | PVB | | phr | 100 | 100 | 100 | 100 | 100 | 100 | 100 | 100 |
| | 3GO | | phr | 40 | 40 | 40 | 40 | 40 | 40 | 40 | 40 |
| | Luminescent material | $Eu(TFA)_3phen$ | phr | 0.2 | — | — | — | — | — | — | — |
| | | $Tb(TFA)_3phen$ | phr | — | 0.2 | — | — | — | — | — | — |
| | | Diethyl 2,5-dihydroxy-terephthalate | phr | — | — | 0.2 | — | — | — | — | — |
| | Colorant | Calcium carbonate | phr | — | — | — | 3.2 | 3.2 | 3.2 | — | — |
| | | Pigment Blue 15 | phr | — | — | — | — | — | — | 3.2 | — |
| | | Pigment Green 7 | phr | — | — | — | — | — | — | — | 3.2 |
| | Adhesion modifier | Acetylacetone magnesium | phr | 0.036 | 0.036 | 0.036 | 0.036 | 0.036 | 0.036 | 0.036 | 0.036 |

TABLE 2-continued

| | | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| Evaluation | Blurred luminescence properties | x | x | x | x | x | x | x | x |
| | Comparison on aesthetic appearances — Comparison with glass not containing colorant (Comparative Examples 1 to 3) | — | — | — | — | — | — | — | — |
| | Comparison with glass not containing luminescent material (Comparative Examples 4 to 8) | — | — | — | — | — | — | — | — |

INDUSTRIAL APPLICABILITY

The present invention can provide a colored luminescent sheet that enables production of a colored glass providing better aesthetic appearance, and a colored luminescent glass including the colored luminescent sheet.

The invention claimed is:

1. A colored luminescent sheet comprising:
   a thermoplastic resin;
   calcium carbonate as a white pigment; and
   a luminescent material that emits visible light having a wavelength of 380 to 750 nm under excitation light.

2. The colored luminescent sheet according to claim 1, wherein the luminescent material is present in an amount of 0.1 to 50 parts by weight relative to 100 parts by weight of the white pigment.

3. A colored luminescent glass having a laminated structure including a transparent plate and the colored luminescent sheet according to claim 1.

4. A window glass comprising:
   an excitation light source; and
   the colored luminescent glass according to claim 3.

5. A display window comprising:
   an excitation light source; and
   the colored luminescent glass according to claim 3.

6. A partition comprising:
   an excitation light source; and
   the colored luminescent glass according to claim 3.

7. A wall glass comprising:
   an excitation light source; and
   the colored luminescent glass according to claim 3.

8. A colored luminescent glass having a structure in which the colored luminescent sheet according to claim 1 is interposed between a pair of transparent plates.

* * * * *